May 24, 1927.
U. G. KNAUFF
HOLDER FOR BAKING POTATOES
Filed Jan. 13, 1926
1,630,188
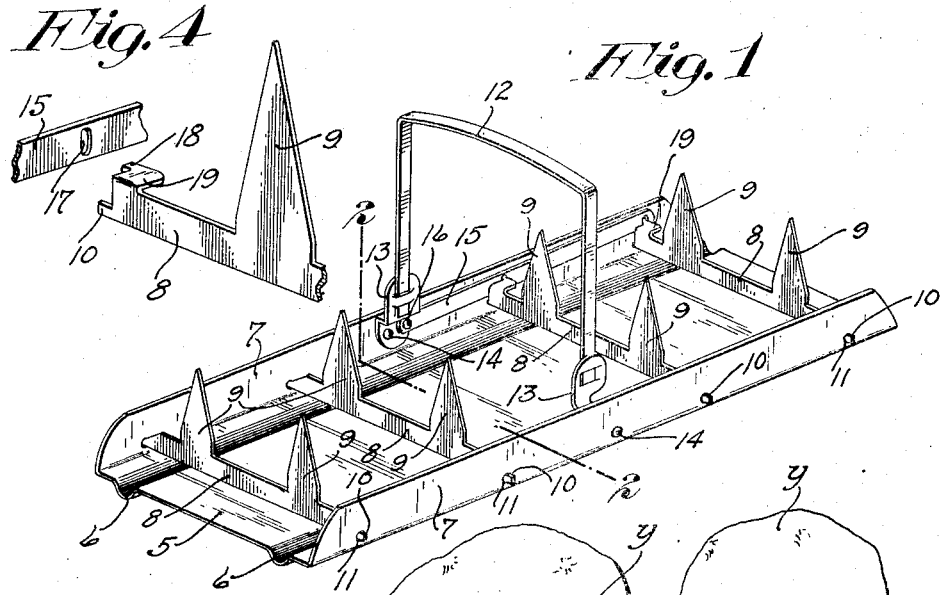
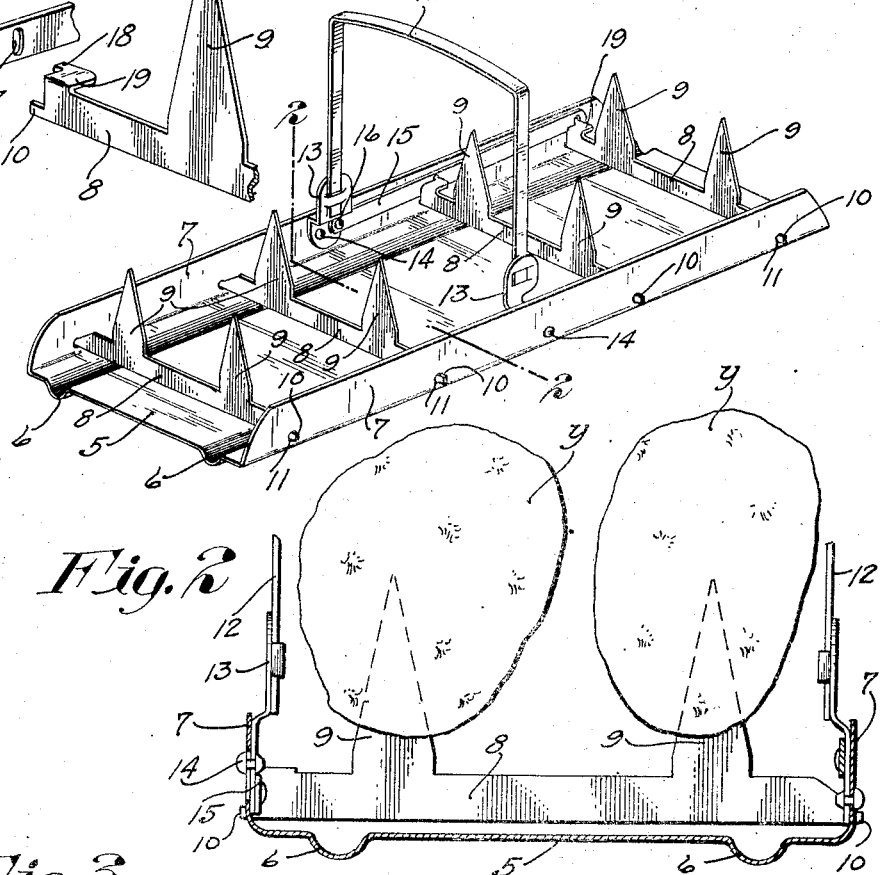
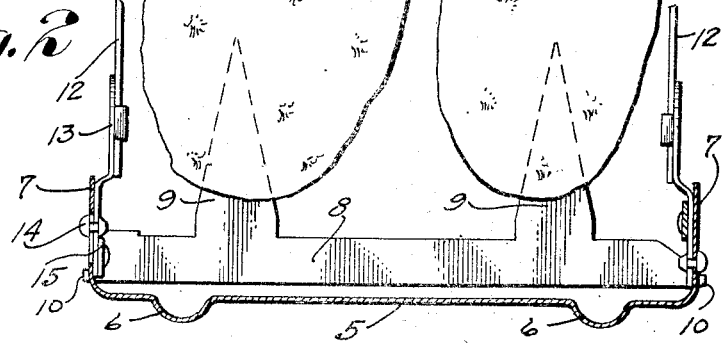
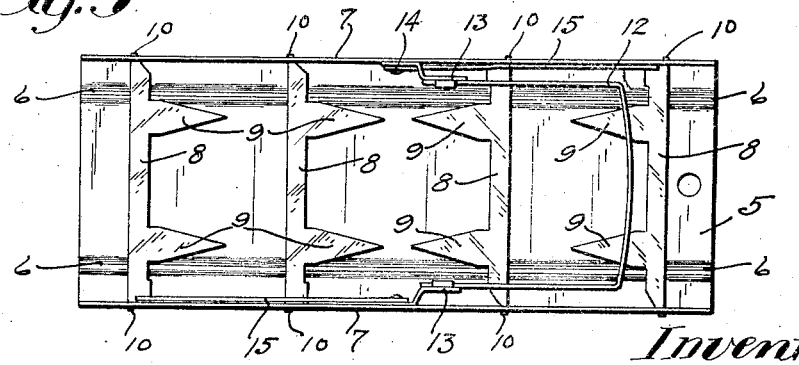
Inventor
Ulysses G. Knauff
By his Attorneys
Michael & Kilgore Patented May 24, 1927.

1,630,188

UNITED STATES PATENT OFFICE.

ULYSSES G. KNAUFF, OF MINNEAPOLIS, MINNESOTA.

HOLDER FOR BAKING POTATOES.

Application filed January 13, 1926. Serial No. 80,953.

My invention provides a simple and highly efficient device for holding potatoes properly spaced and in best positions for baking, and, generally stated, it consists of the novel devices and combinations of devices hereinafter described and defined in the claims.

In practice, I have found that in the baking of potatoes, the quality may be improved if, before baking, the potato be punctured, preferably at one end, and during the baking process, positioned with its puncture at the top or upward. This permits the moisture to escape during the baking process and causes the baked potato to have a dry and mealy consistency.

My invention provides an efficient device for accomplishing the result just stated.

In the accompanying drawings, which illustrate the invention, like characters indicate like parts throughout the several views.

Referring to the drawings:

Fig. 1 is a perspective showing the potato holder adjusted for use;

Fig. 2 is an enlarged transverse section taken approximately on the line 2—2 of Fig. 1, some parts being broken away and illustrating the manner in which the potatoes are applied to the holder;

Fig. 3 is a plan view of the potato holder with the parts thereof folded; and

Fig. 4 is a fragmentary view showing a portion of one of the toothed bars and cooperating link of the base or pan, said parts being separated.

The base member of the device is in the form of a flat channel-shaped pan 5 preferably stamped from sheet metal and formed with depressed bearing ribs 6 and upturned side flanges 7. The numeral 8 indicates crossbars formed with upwardly projected teeth 9 on which the potatoes y are adapted to be pressed into the under sides of the potatoes y. At their ends, the bars 8 are formed with trunnions 10 that are seated in perforations 11 formed in the side flanges 7.

The numeral 12 indicates a yoke-like handle or bail, the prongs of which are secured to heads 13 that are pivoted at 14 to the central portions of the side flanges 7. The number of toothed bars may, of course, be varied, but as shown, there are two such bars on each side of the pivots 14. Located at opposite sides of the pan, one adjacent to each side flange 7, are links 15 that are pivoted to the heads 13 at 16. The pivots 16 are offset from the relatively fixed pivots 14 so that the heads are utilized as cranks to operate the links 15. The said links 15 extend in opposite directions and are provided with vertically elongated perforations 17 in which are seated the offset crank-acting portions 18 of flanged extensions 19 formed on the ends of the respective bars 8.

With the arrangement described, when the handle 12 is raised or turned vertically upward, as shown in Figs. 1 and 2, the bars 8 will be oscillated so that their teeth 9 will stand vertically upward so that the potatoes y may be then forced onto said teeth and held upright, spaced from each other and in proper position for baking. After the potatoes have been baked, they may be conveniently left on the bars until they are to be used and, in fact, the holder may be utilized as a dish and placed on the table with the baked potatoes thereon, so that the potatoes need not be handled at any time after they have been placed on the holder for baking until they are removed from the holder by the person served therewith.

When the holder is out of use, the handle will be turned down as shown in Fig. 3, thereby folding the teeth of the bars below the upper edges of the side flanges 7. The folded device will occupy but small space and the teeth thereof will not project.

What I claim is:

1. A holder for baking potatoes and the like comprising a base, and a plurality of toothed bars mounted on said base for movement of its teeth to and from projected operative positions.

2. A holder for baking potatoes and the like comprising a base, a plurality of teeth mounted on said base for movements to and from projected operative positions, a handle connected to said base for movements to and from an operative position, and connections between said handle and teeth for moving the latter to operating positions when said handle is moved to an operative position and for moving said teeth to inoperative positions when said handle is moved to an operating position.

3. A holder for baking potatoes comprising a base, a plurality of toothed bars pivoted to said base for movement of their teeth to and from upturned operative positions.

4. A holder for baking potatoes comprising a base, a plurality of toothed bars pivoted to said base for movement of its teeth to and from upturned operative positions, a handle pivoted to the central portion of said base, and connections from said handle whereby the teeth of said toothed bars will be raised when said handle is raised and will be turned down when said handle is turned down.

5. A holder for baking potatoes comprising a base plate having upturned side flanges, a plurality of flat toothed bars extended between said side flanges and having end trunnions pivoted in said side flanges, a handle applied to said base plate, and connections between said handle and toothed bars whereby the teeth of the latter will be turned upward when said handle is turned upward and will be turned downward when said handle is turned downward.

6. A holder for baking potatoes comprising a base plate having upturned side flanges, a plurality of flat toothed bars extended between said side flanges and having end trunnions pivoted in said side flanges, a bail-like handle pivoted to the intermediate portions of the side flanges of said base plate, links pivotally attached to said bail-like handle at points offset from its pivots and extended in opposite directions therefrom, one adjacent to each side flange, and offset crank-acting portions on the ends of said toothed bars, pivotally connected to the respective links and arranged to be oscillated thereby.

In testimony whereof I affix my signature.

ULYSSES G. KNAUFF.